US010742929B2

(12) United States Patent
Dove et al.

(10) Patent No.: US 10,742,929 B2
(45) Date of Patent: *Aug. 11, 2020

(54) COMMUNICATION SYSTEM

(71) Applicant: Microsoft Technology Licensing, LLC, Redmond, WA (US)

(72) Inventors: Benjamin Gareth Dove, London (GB); Mohammed Ladha, Pinner (GB); Lee Christopher Pethers, Brentwood (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/110,981

(22) Filed: Aug. 23, 2018

(65) Prior Publication Data

US 2019/0158783 A1    May 23, 2019

Related U.S. Application Data

(63) Continuation of application No. 15/355,688, filed on Nov. 18, 2016, now Pat. No. 10,091,458.

(30) Foreign Application Priority Data

Nov. 20, 2015 (GB) .................................. 1520509.9

(51) Int. Cl.
*H04N 7/14* (2006.01)
*H04L 29/06* (2006.01)
(Continued)

(52) U.S. Cl.
CPC ......... *H04N 7/147* (2013.01); *H04L 65/1006* (2013.01); *H04L 65/1083* (2013.01);
(Continued)

(58) Field of Classification Search
USPC ....................................................... 348/14.07
See application file for complete search history.

(56) References Cited

U.S. PATENT DOCUMENTS 6,633,635 B2   10/2003   Kung et al.
10,091,458 B2  10/2018   Dove et al.
(Continued)

FOREIGN PATENT DOCUMENTS

CN    102291325 A    12/2011
CN    102696028 A    9/2012
(Continued)

OTHER PUBLICATIONS

"Final Office Action Issued in U.S. Appl. No. 15/356,064", dated Feb. 7, 2019, 19 Pages.
(Continued)

*Primary Examiner* — Amal S Zenati
(74) *Attorney, Agent, or Firm* — Schwegman Lundberg & Woessner, P.A.

(57) ABSTRACT

Disclosed are systems, methods, and machine readable mediums which determine whether a computer participating in a network-based conversation deliberately left the network-based conversation. A time period is selected in response to the determination of whether the computer deliberately left the network conversation. After the time period has elapsed, removing a graphical indication of the computing device from a display of a second computing device still part of the network-based conversation.

20 Claims, 3 Drawing Sheets

(51) Int. Cl.
   *H04N 7/15* (2006.01)
   *H04L 29/08* (2006.01)
(52) U.S. Cl.
   CPC ........ *H04L 65/1093* (2013.01); *H04L 65/403* (2013.01); *H04L 65/4069* (2013.01); *H04L 65/608* (2013.01); *H04L 65/80* (2013.01); *H04N 7/15* (2013.01); *H04L 67/36* (2013.01); *H04M 2203/5027* (2013.01)

(56) References Cited

U.S. PATENT DOCUMENTS

| | | | |
|---|---|---|---|
| 2006/0248210 A1 | 11/2006 | Kenoyer | |
| 2008/0232277 A1* | 9/2008 | Foo | H04L 12/1822 370/260 |
| 2015/0304603 A1* | 10/2015 | Yoon | H04W 76/19 348/14.07 |
| 2017/0150096 A1 | 5/2017 | Dove et al. | |

FOREIGN PATENT DOCUMENTS

| | | | | |
|---|---|---|---|---|
| CN | 102726055 A | 10/2012 | | |
| CN | 103155548 A | 6/2013 | | |
| CN | 103999439 A | 8/2014 | | |
| CN | 104871528 A | 8/2015 | | |
| GB | 2338146 A | * | 12/1999 | ............ H04M 3/533 |

OTHER PUBLICATIONS

"Non Final Office Action Issued in U.S. Appl. No. 15/356,064", dated Jul. 12, 2018, 17 Pages.

"First Office Action and Search Report Issued in Chinese Patent Application No. 201680069391.X", dated Apr. 17, 2020, 19 pages.

* cited by examiner

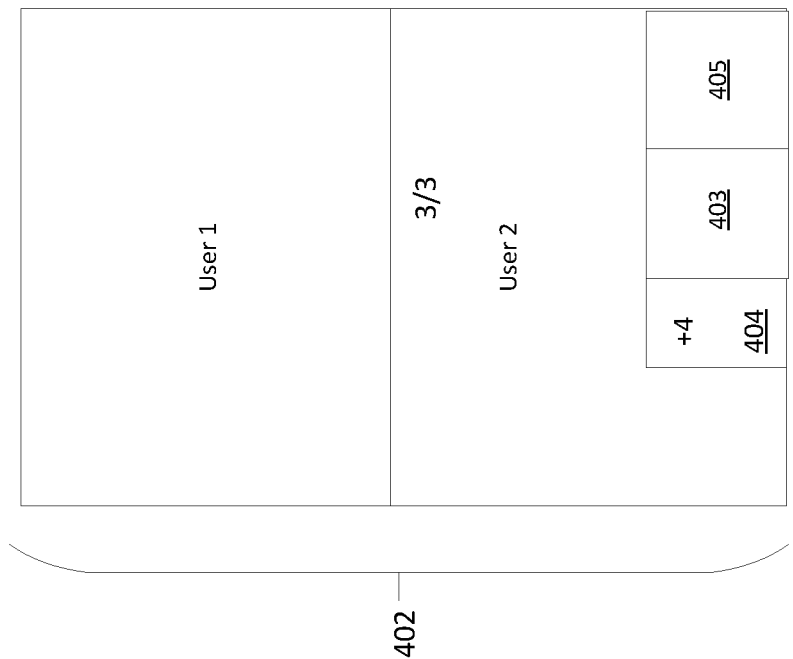

COMMUNICATION SYSTEM

PRIORITY APPLICATIONS

This application is a continuation of and claims priority to U.S. patent application Ser. No. 15/355,688, filed Nov. 18, 2016, entitled "Communication System", which claims priority under 35 USC 119 or 365 to Great Britain Application No. 1520509.9, filed Nov. 20, 2015, entitled "Communication System", the disclosures of which are incorporated in their entirety.

FIELD OF THE INVENTION

The present invention relates to a method, an apparatus and a computer program product.

BACKGROUND

A conversation visualisation environment is an environment operating on a device that causes graphical content associated with an exchange between users to be rendered on a display to one of the users performing the exchange. The exchange and the conversation visualisation environment result from the execution of code relating to a communication protocol on at least one processor. Conversation visualisation environments allow conversation participants to exchange communications in accordance with a variety of conversation modalities. For example, participants may engage in video exchanges, voice calls, instant messaging, white board presentations, and desktop views of other modes.

As the feasibility of exchanging conversation communications by way of a variety of conversation modalities has increased, so too have the technologies with which participants may engage in a video call using traditional desktop or laptop computers, tablets, phablets, mobile phones, gaming systems, dedicated conversation systems, or any other suitable communication device. Different architectures can be employed to deliver conversation visualisation environments, including centrally managed and peer-to-peer architectures.

Many conversation visualisation environments provide features that are dynamically enabled or otherwise triggered in response to various events. For example, emphasis may be placed on one particular participant or another in a gallery of video participants based on which participant is speaking at any given time. Other features give participants notice of incoming communications, such as a pop-up bubble alerting a participant to a new chat message, video call, or voice call.

SUMMARY

During a video call, the conversation visualisation environment may render visual data (such as a dynamic-image or static-image data) associated with a user on the display screen so as to indicate the presence of the user on the call. The visual data is used to represent its respective user. For example, if Alice is talking to Bob and Charlie on a video call, the conversation visualisation environment may cause real-time (or near real-time) videos produced by Bob and Charlie's respective user terminals to be rendered on a display screen controlled by Alice's user equipment.

The inventors have realised that the layout/configuration of the display of visual information can change immediately in response to events, which can result in frequent and unnecessary change in the rendered display. To repeatedly change how things are rendered on the display may further result in an inefficient use of computing resources of the user terminal.

Accordingly, according to a first aspect, there is provided a method comprising: causing a display device to render a representation of a user of a second computing device that is part of a network-based conversation with the computing device, the conversation including one or more communication modalities; determining that the second computing device is no longer part of the network-based conversation; determining, based upon a received communication, whether the second computing device deliberately left the network-based conversation; based upon a received communication; selecting a particular period of time based upon whether the second computing device deliberately left the network-based conversation; and removing the display of the representation of the user upon expiry of the particular period of time, the second computing device having not rejoined the network-based conversation during the period of time.

According to a second aspect, there is provided a computing device comprising at least one computer processor; a memory storing instructions, which when executed by the at least one computer processor, causes the at least one computer processor to perform operations comprising: causing a display device to render a representation of a user of a second computing device that is part of a network-based conversation with the computing device, the conversation including one or more communication modalities; determining that the second computing device is no longer part of the network-based conversation; determining, based upon a received communication, whether the second computing device deliberately left the network-based conversation; based upon a received communication; selecting a particular period of time based upon whether the second computing device deliberately left the network-based conversation; removing the display of the representation of the user upon expiry of the particular period of time, the second computing device having not rejoined the network-based conversation during the period of time.

According to a third aspect, there is provided a computer program comprising computer executable instructions, which when executed by a computer, cause the computer to perform the method of claim 11.

FIGURES

For a better understanding of the subject matter and to show how the same may be carried into effect, reference will now be made by way of example only to the following drawings in which:

FIGS. 4 and 5 are a schematic illustration of a conversation visualisation environment rendered via a display.

DESCRIPTION

The present application is directed towards preventing unnecessary changes to the layout on a screen of visual data that is associated with respective users on a call, which can improve the processing efficiency of a processor controlling the display on that screen. In particular, the present application is directed towards limiting changes in a configuration of rendered visual data used to represent respective different users on a call due to poor network conditions.

To enable this effect, the following discloses a user terminal configured to operate a call with at least one other user terminal over a network. Details associated with the call, including visual information associated with the other user (i.e. the user operating the at least one other user terminal), are rendered in a first area of a display controllable by the user terminal. If the other user terminal loses connection with the call (e.g. the call drops), the user terminal is configured to determine whether or not the ending of that connection is deliberate. If it is determined that the ending of that connection is not deliberate (e.g. poor network conditions caused the connection to end), the user terminal retains the first area on the display for a predetermined amount of time to allow the other user time to reconnect with the call. The predetermined amount of time is different if the ending of the connection is deliberate compared to when it is accidental. In other words, the layout of areas of the screen that are dedicated to representing particular users on a call does not immediately change in response to the ending on the connection of one of those users if it is determined that the connection was not ended on purpose. For the case where the call is a multi-user call, visual information associated with other users on the call (which may be rendered in other places of the display) is not placed in the first area during the predetermined amount of time. The predetermined amount of time is longer than the predetermined time used in the case it is determined that the ending of the call was deliberate (e.g. in the case of the other user deliberately ended the call via an inputted instruction to that effect to their user terminal). This allows the other user time to reconnect to the call whilst retaining the display configuration (hence reducing the likelihood of making an unnecessary change to the allocation of display space on the display to different users on the call).

In order that the environment in which the present system may operate be understood, by way of example only, we describe a potential communication system and user equipment into which the subject-matter of the present application may be put into effect. It is understood that the exact layout of this network is not limiting.

Figure 1:
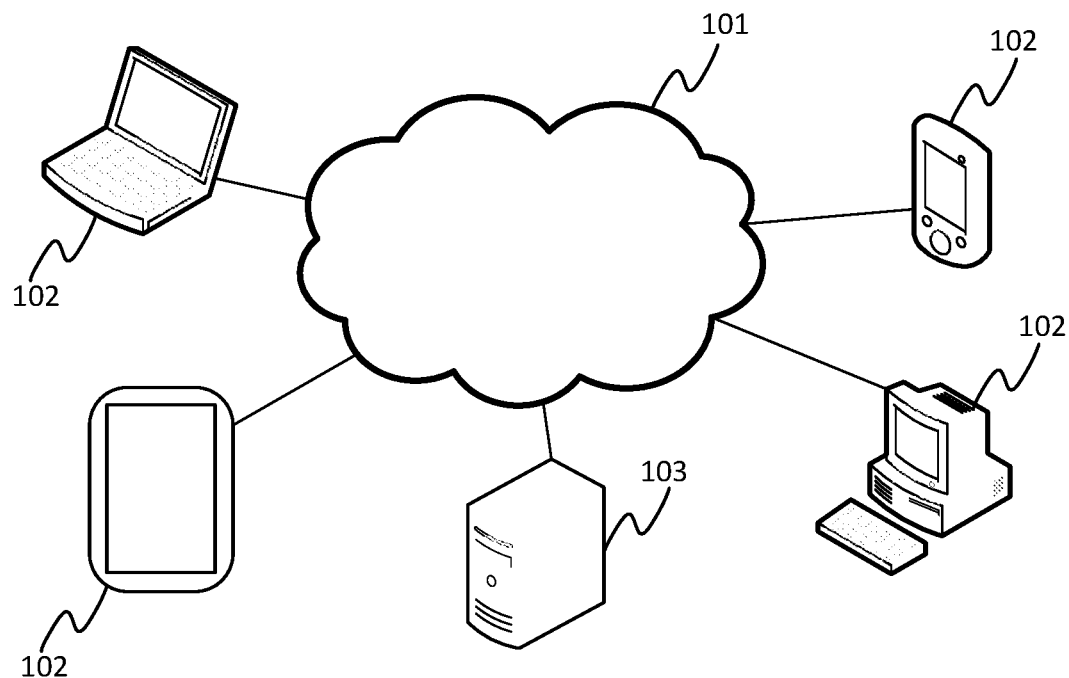
FIG. 1 is a schematic illustration of a communication system.

FIG. 1 shows an example of a communication system in which the teachings of the present disclosure may be implemented. The system comprises a communication medium 101, in embodiments a communication network such as a packet-based network, for example comprising the Internet and/or a mobile cellular network (e.g. 3GPP network). The system further comprises a plurality of user terminals 102, each operable to connect to the network 101 via a wired and/or wireless connection. For example, each of the user terminals may comprise a smartphone, tablet, laptop computer or desktop computer. In embodiments, the system also comprises a network apparatus 103 connected to the network 101. It is understood, however, that a network apparatus may not be used in certain circumstances, such as some peer-to-peer real-time communication protocols. The term network apparatus as used herein refers to a logical network apparatus, which may comprise one or more physical network apparatus units at one or more physical sites (i.e. the network apparatus 103 may or may not be distributed over multiple different geographic locations).

Figure 2:
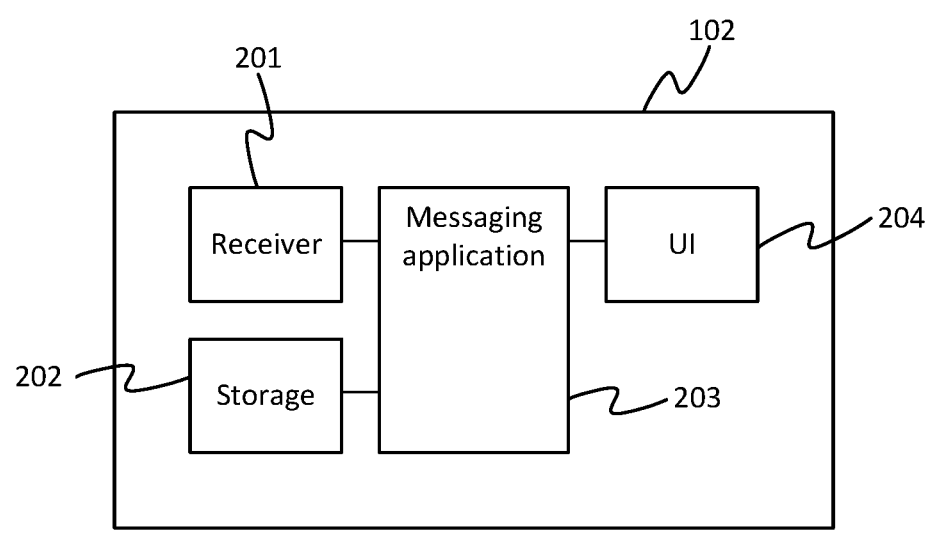
FIG. 2 is a schematic block-diagram of a user terminal.

FIG. 2 shows an example of one of the user terminals 102 in accordance with embodiments disclosed herein. The user terminal 102 comprises a receiver 201 for receiving data from one or more others of the user terminals 102 over the communication medium 101, e.g. a network interface such as a wired or wireless modem for receiving data over the Internet or a 3GPP network. The user terminal 102 also comprises a non-volatile storage 202, i.e. non-volatile memory, comprising one or more internal or external non-volatile storage devices such as one or more hard-drives and/or one or more EEPROMs (sometimes also called flash memory). Further, the user terminal comprises a user interface 204 comprising at least one output to the user, e.g. a display such as a screen, and/or an audio output such as a speaker or headphone socket. The user interface 204 will typically also comprise at least one user input allowing a user to control the user terminal 102, for example a touchscreen, keyboard and/or mouse input.

Furthermore, the user terminal 102 comprises a messaging application 203, which is configured to receive messages from a complementary instance of the messaging application on another of the user terminals 102, or the network apparatus 103 (in which cases the messages may originate from a sending user terminal sending the messages via the network apparatus 103, and/or may originate from the network apparatus 103).

The messaging application is configured to receive the messages over the network 101 (or more generally the communication medium) via the receiver 201, and to store the received messages in the storage 202. For the purpose of the following discussion, the described user terminal 102 will be considered as the receiving (destination) user terminal, receiving the messages from one or more other, sending ones of the user terminals 102. Further, any of the following may be considered to be the entity immediately communicating with the receiver: as a router, a hub or some other type of access node located within the network 101. It will also be appreciated that the messaging application 203 receiving user terminal 102 may also be able to send messages in the other direction to the complementary instances of the application on the sending user terminals and/or network apparatus 103 (e.g. as part of the same conversation), also over the network 101 or other such communication medium.

The messaging application may transmit audio and/or visual data using any one of a variety of communication protocols/codecs. For example, audio data may be streamed over a network using a protocol known Real-time Transport Protocol, RTP (as detailed in RFC 1889), which is an end-to-end protocol for streaming media. Control data associated with that may be formatted using a protocol known as Real-time Transport Control Protocol, RTCP (as detailed in RFC 3550). Session between different apparatuses may be set up using a protocol such as the Session Initiation Protocol, SIP.

The following discusses embodiments of the presently described system. It is understood that various modifications may be made within this embodiment without exceeding the scope of the claimed invention.

There is provided a user terminal configured to control a rendering of visual data on an associated display, the user terminal comprising at least one processor and at least one memory comprising computer code. In this sense, the term associated display refers to a display that the user terminal may use to render graphical information relating to a call. When executed on the at least one processor, the computer code causes the user terminal to present a conversation visualisation environment relating to a call.

The call may be a multi-user call. By this, it is meant that several (at least three) users are participating in the call. Each user may be represented by respective visual data rendered on the display such that within the call, they may be uniquely represented or otherwise identified by their respective visual data. The visual data may be static image data (e.g. an icon or a photo or a rendering of an identity of the user represented by the visual data) and/or dynamic image data (such as video data and/or a gif). The visual data may be supplied or otherwise indicated by a network device that acts to coordinate communications relating to the call. The following disclosure will be discussed in the context of a multi-user call for clarity and consistency. However, it is understood that the present disclosure is not limited to this case and techniques disclosed herein may also apply to calls between only two users.

The user terminal is caused to receive an incoming stream of data for the multi-user call from the network entity coordinating the call. Aside from the audio information that accompanies the call, the incoming stream comprises at least an indication of visual data associated with respective users on the call. As mentioned above, at least an indication of visual data may comprise dynamic data, static image data and/or an indication that the user on the call does not have an associated image. In this latter case, the conversation visualisation environment may select an icon to display in place of visual data. For example, in a video call between Alice, Bob and Charlie, Alice's device may receive video data for Bob and static-image data for Charlie. This received respective visual data may be used by Alice's device to render the respective visual data on Alice's display, to indicate the users currently participating in the call. The incoming stream does not necessarily comprise visual data (or an indication thereof) for every user on the call (although, as per the example mentioned above, it may). Instead, it may be that the user terminal is configured to receive the associated visual data of only a subset of users on the call. The user terminal may achieve this by only subscribing to receive visual data for particular users on the multi-user call. The subscription could be made to and/or coordinated by a central network entity, as described further below.

The user terminal may be further caused to render, in the conversation visualisation environment presented on the display, multiple visual data, each rendered visual data representing a respective user participating in the multi-user call. It is understood that the type of visual data used to represent a respective user may vary between users on the call in dependence on both the visual information available for a user and in dependence on a priority level associated with a user. For example, less active users may be represented through a graphical representation of their identity rather than through image data. The user terminal may subscribe to the network entity to receive image data (e.g. video data) associated with different users only when it is to be rendered on the associated display.

The user terminal may determine that one of the users on the call has ended their connection to the multi-user call. This ending may be deliberate (e.g. by pressing a "hang up" or "end call" option) or accidental (e.g. through poor network conditions and/or a power failure by the device being used by the other user). The user terminal may therefore determine whether or not the ending of the connection is deliberate (i.e. whether it is deliberate or accidental).

The user terminal is further configured to retain the area of the display previously used to render visual information associated with that other user for the other user for a predetermined amount of time. By this, it is meant that the user terminal does not utilise said area of the display for representing another user on the call within the predetermined amount of time. The predetermined time is dependent on the determination of whether or not the ending of the connection is deliberate such that the predetermined time is different for a deliberate ending of the connection compared to when it is accidental. For example, if the ending of the connection is deliberate, the user terminal may retain the area of the display for a smaller amount of time than if the ending of the connection is not deliberate. This allows the other user time to reconnect with the multi-user call and to continue the call with their visual data continuing to be displayed in its original position on the display screen, which reduces the amount of change to the configuration of the displayed visual data. Original, in this sense, refers to the area of the display allocated to rendering visual information associated with the other user by the conversation visualisation environment immediately prior to the connection ending.

FIG. 4 displays a conversation visualisation environment 401. The conversation visualisation environment may be caused to be rendered on a screen controlled by a user terminal as a result of code executing on at least one processor to which the user terminal has executable access.

Within the conversation visualisation environment 401, there is a primary area 402 that is configured to display video data associated with user 1 and user 2 on a multi-user phone call. Within the conversation visualisation environment 401, there is further a secondary area 403 that is configured to display video data of user 3. The resolution of the video data of user 3 is smaller than that of the resolution of the video data of user 1 and user 2, as the size of the secondary area 403 is much less than the size of the primary area 402 allocated to each of user 1 and user 2.

Immediately adjacent to the secondary area 403, there is a tertiary area 404 in which a summary of the other users on the multi-user call is rendered. In the example of FIG. 4, the summary indicates that there are four more users on the multi-user call by displaying the graphical symbol "+4". There is a final area 405 depicted, in which video data associated with the user using the user terminal is provided.

If user 2 subsequently loses connection to the multi-user call depicted in FIG. 4, the user terminal is configured to retain the configuration of FIG. 4 until the elapse of the predetermined time determined according to whether or not the user terminal determines that user 2 deliberately lost connection to the multi-user call. If user 2 reconnects within the predetermined time, the configuration of FIG. 4 is maintained. If user 2 does not reconnect within the predetermined time, visual data for another user on the multi-user call may take the place of the area previously assigned to user 2. This is illustrated with respect to FIG. 5.

FIG. 5 differs from FIG. 4 in that visual data for user 3 is being rendered in the primary area 402 in place of user 2 and the "+4" indication in the tertiary area to represent that there are three other users for whom image data is not being rendered has been updated to "+3".

Figure 3:
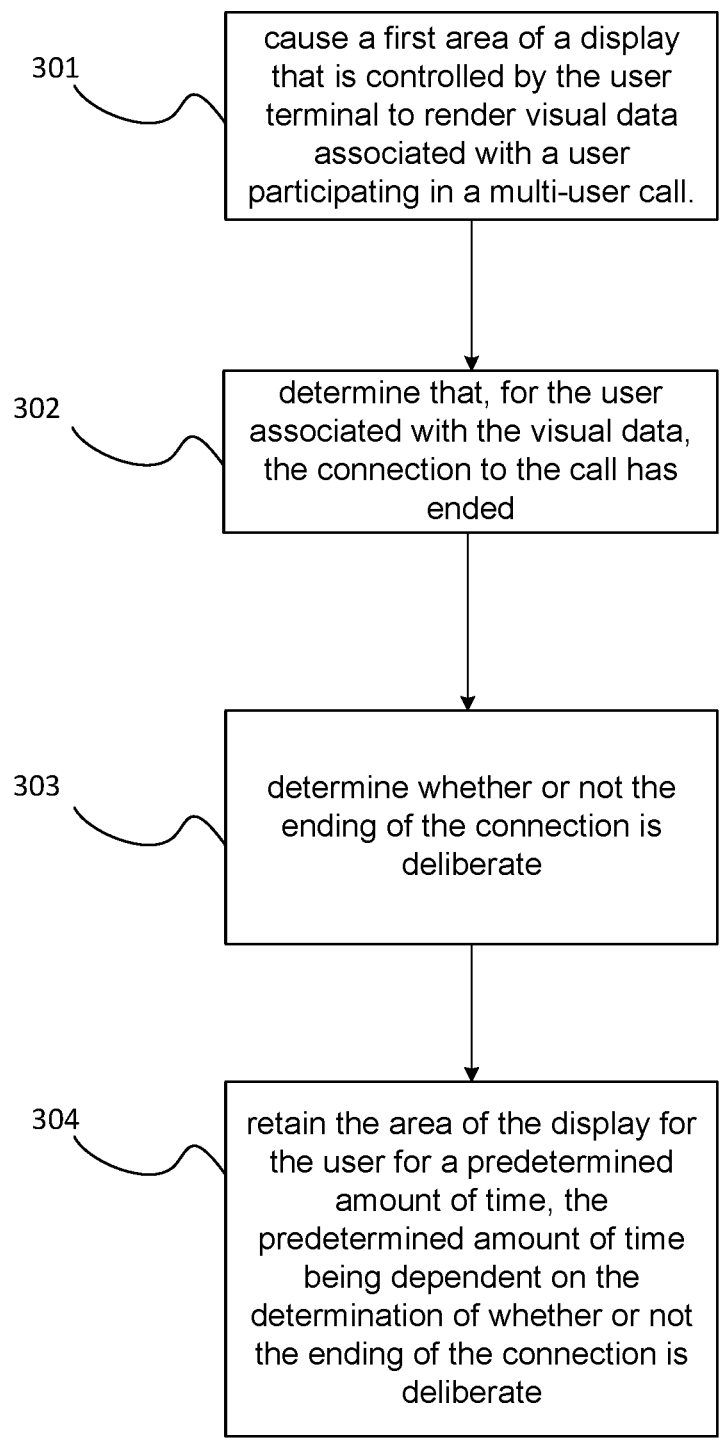
FIG. 3 is a flowchart illustrating potential actions performed by a user terminal.

The present embodiment is described with reference to the flow chart of FIG. 3, which illustrates certain actions that may be performed by a user terminal. As in the case mentioned above, these actions that are performed by the user terminal may be enabled by way of computer code, stored on memory that is accessible by the user terminal, when executed by at least one processor to which the user terminal has executable access.

At step 301, the user terminal causes a first area of a display that is controlled by the user terminal to render visual data associated with a user participating in a multi-user call. In this (and later) contexts, the term visual data associated with a user refers to visual data that is used to represent the user during a call. As in the case mentioned above, the term visual data covers not only text representative of an identity of a user on the multi-user call, but may further use image data (including at least static and dynamic image data). The visual data (or an indication thereof) may be received by the user terminal from a network entity that is coordinating the multi-user call. In an embodiment, the visual data is image data, which is rendered data not wholly composed of a text string. In an embodiment, the visual data is video data.

At step 302, the user terminal determines that, for the user associated with the visual data, the connection to the call has ended. This means that the user associated with the visual data. is no longer transmitting audio and/or visual data to the user terminal.

At step 303, the user terminal is configured to determine whether or not the ending of the connection is deliberate. This may be done in a variety of ways. The user terminal may determine that the ending of the connection is deliberate or not following an explicit indication received from the network entity. For example, the user terminal may receive a message from the network that informs the user terminal that the ending of the connection is one of: deliberate; and not deliberate. This could be achieved by use of a specific bit (or bit sequence) indicated in a message. The explicit indication may be an indication of the reason for the dropped connection (e.g. the other user has pressed a "terminate call" button, the connection has timed out). The user terminal may determine that the ending of the connection is deliberate following an implicit indication received from the network entity. For example, the user terminal may receive signal indications over the course of the multi-user call that is indicative of the interference and/or congestion experienced by communications originating from the user associated with the visual information. From examining the trend in, and/or level of interference/congestion, the user terminal may determine whether or not the ending of the call connection is deliberate. For example, if there is determined to be a high level of lost packets in the network immediately prior to the connection being ended, which may be indicative of the connection being ended accidentally.

At step 304, the user terminal is configured to retain the area of the display for the user for a predetermined amount of time, the predetermined amount of time being dependent on the determination of whether or not the ending of the connection is deliberate. Therefore, the predetermined amount of time may be longer when the ending of the connection is not deliberate (i.e. accidental) than when it is deliberate.

To communicate what is happening to the user of the user terminal, the user terminal may be configured to replace the visual data previously associated with user whose connection has ended with an indication as to whether or not the ending of the connection is deliberate. For example, a video feed of a user may be replaced with a notice stating that the user has ended the call. The video feed of the user may be replaced with a notice stating that a connection to the user has been lost. This indication may replace only part of the visual data, such that it is superposed over the visual data. The notice may be places over a greyed out version of image data that was previously used to represent the user on the display.

After the predetermined amount of time has expired, if the user has not re-established a connection to the call, the user terminal is configured to reallocate the area of the display to at least one other user participating in the multi-user call. This reallocation may be performed in dependence on an activity level of the users on the call, such that the next most-active user on the call replaces the user whose connection has been lost. The user terminal may reallocate the area of the display to more than one other user participating in the multi-user call, such that the configuration/layout rendered on the display of the visual information associated with respective users on the multi-user call changes compared to before the pre-determined time expires. The reallocation may depend on a priority level associated with each user. For example, each user may be associated with a respective priority representative of an activity level of the user on the call. The reallocation may operate to reallocate the newly available area of the display to a user who has the highest priority. It may be that some users do not, when the connection ends, have associated image data rendered on the display. The reallocation may operate to only consider the users who do not currently have image data representing themselves on the display.

It may be that at least one of the users to whom the first area has been reallocated is not a user for whom the user terminal is currently receiving at least an indication of visual information. In this case, the user terminal is configured to request, from the network entity, at least an indication of visual data associated with the at least one other user participating in the multi-user call before rendering, on the display, the visual data associated with the at least one other user.

It may be that visual data for at least one of the users to whom the first area has been reallocated is being received at the user terminal at a first resolution. The user terminal, in this case, may compare the first resolution to a threshold level associated with the first area. If the comparison yields that the received resolution is below the threshold level, the user equipment may request, from the network entity, a higher resolution of visual data associated with that user. If the comparison yields that the received resolution is above the threshold level, the user equipment does not request a higher resolution of visual data associated with that user. The received visual data (in both cases), may be rendered in the first area.

If the user whose connection has ended reconnects with the multi-user call within the predetermined amount of time, the user terminal may be further arranged to render, on the first area of the display, the visual data associated with the user. Therefore, the first area may be caused to display the visual data associated with the user on reestablishment of the call. In this case, the layout/configuration of the visual data associated with respective users on the multi-user call is unchanged (i.e. the layout/configuration is the same before the connection is ended as immediately after the connection is re-established). It is understood that, in this sense, re-establishing a connection merely refers to a user re-connecting to a call, and does not limit the re-established connection to use any of the same parameters to set up the connection, bar a user identity.

The user terminal may determine that said user is reconnecting/has reconnected by receiving a request to connect to the multi-user call, the request comprising an identity of a user that initiated the connect request. The user terminal may compare the received identity to an identity of the user whose connection to the call has ended. If the identities are the same, the user terminal is configured to render the visual data associated with the user on the first area of the display, as per the above. If the identities are different, the user terminal is configured to render an indication on the display that a new user has joined the multi-user call, but does not cause visual information associated with any other user to be rendered in the first area until at least the predetermined time has expired (as described above).

Moreover, the above-described techniques have especial use in packet communication networks that use the Voice over Internet Protocol (VoIP), which is a set of protocols and methodologies for transmitting audio data over a communication medium.

The above-described techniques have especial user when the visual data is video data. The video data is real-time or near real-time.

The above-described techniques have been made with reference to a multi-user call. During a multi-user call, the user terminal may receive information regarding the phone call from multiple (i.e. two or more) other user terminals. The information regarding the phone call may be coordinated by a centralised server (hereinafter known as the network entity), through which all external communications relating to the call are sent. In this case, the user terminal may send a subscription request to the network entity to indicate the streams of data it wishes to receive for the call. For simplicity, the following above only refers to the case of a multi-user call, but it is understood that similar techniques may be applied when the user terminal is in a call with only one other user terminal.

According to the above, there is provided a method comprising: rendering, on a first area of a display controlled by a user terminal, visual data associated with a user participating in a call; determining that the user's connection to the call has ended; determining whether or not the ending of the connection is deliberate; and retaining the area of the display for the user for a predetermined amount of time in dependence on the determination of whether or not the ending of the connection is deliberate.

The predetermined amount of time may be longer when the ending of the connection is not deliberate than when it is deliberate.

The retained area of the display may comprise an indication as to whether or not the ending of the connection is deliberate.

The call may be a multi-user call and, after the predetermined amount of time has expired, the method may further comprise: reallocating the area of the display to at least one other user participating in the multi-user call. Each user may be associated with a respective priority representative of an activity level of the user on the call, and the method may further comprise: selecting the at least one other user in dependence on the respective priorities. The method may further comprise: requesting, from a network entity, at least an indication of visual data associated with the at least one other user participating in the multi-user call; and rendering, on the display, the visual data associated with the at least one other user.

If said user reconnects with the call within the predetermined amount of time, the method may further comprise: rendering, on the first area of the display, the visual data associated with the user. It may be determined that said user is reconnecting by: receiving a request to connect to the multi-user call; determining an identity of a user that initiated the connect request; comparing the identity to an identity of the user whose connection to the call has ended; and if the identities are determined to be the same via the comparison, rendering the visual data associated with the user on the first area of the display.

The visual data associated with the user may be rendered on the display to extend to the edges of the area immediately prior to the ending of the connection to the call.

There is further provided a user terminal comprising: at least one processor; and at least one memory comprising code that, when executed on the at least one processor, causes the user terminal to: render, on a first area of a display controlled by a user terminal, visual data associated with a user participating in a call; determine that the user's connection to the call has ended; determine whether or not the ending of the connection is deliberate; and retain the area of the display for the user for a predetermined amount of time in dependence on the determination of whether or not the ending of the connection is deliberate.

The predetermined amount of time may be longer when the ending of the connection is not deliberate than when it is deliberate.

The retained area of the display may comprise an indication as to whether or not the ending of the connection is deliberate.

The call may be a multi-user call and, after the predetermined amount of time has expired, and the user terminal may be further caused to: reallocate the area of the display to at least one other user participating in the multi-user call. Each user may be associated with a respective priority representative of an activity level of the user on the call, and the user terminal is further caused to: select the at least one other user in dependence on the respective priorities. The user terminal may be further caused to: request, from a network entity, at least an indication of visual data associated with the at least one other user participating in the multi-user call; and render, on the display, the visual data associated with the at least one other user. If said user reconnects with the call within the predetermined amount of time, the user terminal may be further caused to: render, on the first area of the display, the visual data associated with the user. It may be determined that said user is reconnecting by: receiving a request to connect to the multi-user call; determining an identity of a user that initiated the connect request; comparing the identity to an identity of the user whose connection to the call has ended; and if the identities are determined to be the same through the results of the comparison, rendering the visual data associated with the user on the first area of the display.

The visual data associated with the user may be rendered on the display to extend to the edges of the area immediately prior to the ending of the connection to the call.

There is further provided a computer program comprising computer executable instructions, which when executed by a computer, cause the computer to perform the method of claim 1.

The computer program may further comprise computer executable instructions, which when executed by a computer, cause the computer to perform the method of any of claims 2 to 9.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). Where a particular device is arranged to execute a series of actions as a result of program code being executed on a processor, these actions may be the result of the executing code activating at least one circuit or chip to undertake at least one of the actions via hardware. At least one of the actions may be executed in software only. The program code can be stored in one or more computer readable memory devices. The features of the techniques described below are platform-independent, meaning that the techniques may be implemented on a variety of commercial computing platforms having a variety of processors.

For example, the user terminals configured to operate as described above may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Computer-readable storage media do not include signals per se. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device comprising:
at least one computer processor;
a memory storing instructions, which when executed by the at least one computer processor, causes the at least one computer processor to perform operations comprising:
  causing a display device to render a representation of a user of a second computing device that is part of a network-based conversation with the computing device;
  determining that the second computing device is no longer part of the network-based conversation;
  determining, based upon a received communication, whether the second computing device deliberately left the network-based conversation;
  selecting a particular period of time based upon whether the second computing device deliberately left the network-based conversation, wherein the selected period of time is different if the second computing device deliberately left the network-based conversation than if the second computing device did not deliberately leave the network-based conversation; and
  removing the display of the representation of the user upon expiry of the particular period of time and based upon the second computing device having not rejoined the network-based conversation during the particular period of time.

2. The computing device of claim 1, wherein the received communication is from a network entity controlling the network-based conversation.

3. The computing device of claim 1, wherein the received communication is from the second computing device.

4. The computing device of claim 3, wherein the operations of determining whether the second computing device deliberately left the network-based conversation based upon the received communication from the second computing device comprises:
determining whether the second computing device deliberately left the network-based conversation based upon determining interference or congestion based upon the received communication.

5. The computing device of claim 1, wherein the network-based conversation is an online meeting.

6. The computing device of claim 5, wherein the network-based conversation includes video.

7. The computing device of claim 1, wherein the representation of the user of the second computing devices comprises a video of the user.

8. The computing device of claim 1, wherein the representation of the user of the second computing device comprises a picture of the user.

9. The computing device of claim 1, wherein the operations further comprise:
changing the representation of the user of the second computing device to indicate whether the user of the second computing device deliberately left the network-based conversation.

10. A method performed by a computing device, the method comprising operations comprising:
causing a display device to render a representation of a user of a second computing device that is part of a network-based conversation with the computing device;
determining that the second computing device is no longer part of the network-based conversation;
determining, based upon a received communication, whether the second computing device deliberately left the network-based conversation;
selecting a particular period of time based upon whether the second computing device deliberately left the network-based conversation wherein the selected period of time is different if the second computing device deliberately left the network-based conversation than if the second computing device did not deliberately leave the network-based conversation; and
removing the display of the representation of the user upon expiry of the particular period of time and based upon the second computing device having not rejoined the network-based conversation during the particular period of time.

11. The method of claim 10, wherein the received communication is from a network entity controlling the network-based conversation.

12. The method of claim 10, wherein the received communication is from the second computing device.

13. The method of claim 12, wherein the operations of determining whether the second computing device deliberately left the network-based conversation based upon the received communication from the second computing device comprises:

determining whether the second computing device deliberately left the network-based conversation based upon determining interference or congestion based upon the received communication.

14. The method of claim 10, wherein the network-based conversation is an online meeting.

15. The method of claim 14, wherein the network-based conversation includes video.

16. The method of claim 10, wherein the representation of the user of the second computing devices comprises a video of the user.

17. The method of claim 10, wherein the representation of the user of the second computing device comprises a picture of the user.

18. The method of claim 10, wherein the operations further comprise:
changing the representation of the user of the second computing device to indicate whether the user of the second computing device deliberately left the network-based conversation.

19. A computing device comprising:
means for causing a display device to render a representation of a user of a second computing device that is part of a network-based conversation with the computing device, the conversation;
means for determining that the second computing device is no longer part of the network-based conversation;
means for determining, based upon a received communication, whether the second computing device deliberately left the network-based conversation;
means for selecting a particular period of time based upon whether the second computing device deliberately left the network-based conversation, wherein the selected period of time is different if the second computing device deliberately left the network-based conversation than if the second computing device did not deliberately leave the network-based conversation; and
means for removing the display of the representation of the user upon expiry of the particular period of time and based upon the second computing device having not rejoined the network-based conversation during the particular period of time.

20. The computing device of claim 19, wherein the received communication is from a network entity controlling the network-based conversation.

* * * * *